United States Patent [19]

Sieradzki et al.

[11] 3,793,575
[45] Feb. 19, 1974

[54] NUMERICALLY CONTROLLED SYSTEM FOR GEAR CUTTING MACHINE

[75] Inventors: Ryszard Sieradzki, Troy; Daniel Goldman, Southfield, both of Mich.

[73] Assignee: Electronic Indexing, Inc., West Bloomfield, Mich.

[22] Filed: Apr. 23, 1973

[21] Appl. No.: 353,554

[52] U.S. Cl.................. 318/39, 318/571, 318/603
[51] Int. Cl. ............................................ G05b 19/24
[58] Field of Search ...... 318/603, 39, 571, 685, 696

[56] References Cited
UNITED STATES PATENTS

| | | | |
|---|---|---|---|
| 3,232,170 | 2/1966 | Findley | 318/39 X |
| 3,267,344 | 8/1966 | McDaniel | 318/39 |
| 3,469,495 | 9/1969 | Kelly | 318/571 X |
| 3,621,357 | 11/1971 | Kubo | 318/603 X |
| 3,705,339 | 12/1972 | Rhoades | 318/39 X |

Primary Examiner—B. Dobeck
Attorney, Agent, or Firm—Hauke, Gifford, Patalidis & Dumont

[57] ABSTRACT

The machine is controlled by a selective digital input to provide gear indexing to determine the number of teeth and to provide table movement to control the extent of axial movement required to machine the gear from a gear blank. The numerical input information is provided by a cascaded decade arrangement of binary coded decimal switches to control each of the two necessary functions of head stepping and table stepping movement in both forward and return direction. It is possible to pre-program and to change the degree of accuracy to which the gear cutting is to be carried out by further presetting in the system a digital number representing the number of parts in which the 360° circle representing the gear blank circumference is to be divided.

26 Claims, 5 Drawing Figures

Fig-5

NUMERICALLY CONTROLLED SYSTEM FOR GEAR CUTTING MACHINE

BACKGROUND OF THE INVENTION

A number of systems are known for providing a numerical control arrangement for gear cutting. Such systems have been devised, for example, for helical thread cutting such as the system shown in U. S. Pat. No. 3,267,344 issued on Aug. 16, 1966 for "Numerically Controlled Work and Feed Motor Driven Gear-Hopper."

The present invention is particularly directed toward cutting of spur gears, although it is possible by changing the path of relative movement between cutter and gear blank to provide different shaped gears such as straight, bevel or helical. It will be understood that while the present invention is particularly adapted for the cutting of gear teeth on a gear blank, it is likewise applicable to other systems in which an approach and return are required, plus a rotary indexing of the part being machined. In this way, the basic principles of the invention may be extended to equipment for sharpening cutters, machining flutes in workpieces, cutting splines in workpieces and the like.

SUMMARY OF THE INVENTION

The present invention will thus be seen to include a numerically controlled system with ready provision for changing the cutting program for a particular workpiece with the digital information preset by thumbwheel binary coded decimal switches, greatly simplifying the initial setup and subsequent changeovers to different gear types. The numerical control system further makes provision for a rapid return during the reciprocating movement of the table carrying the part being machined, further to speed the machining operation. The system is exceedingly versatile in that it makes provision for changing the tolerance for the part being machined merely by changing the setting prewired for the number of decimal parts to which the accuracy is to be carried out. All of the various components in the system are either of the TTL or DTL type, which represent integrated circuits compatible one with the other and readily available on the commercial market today.

In the appended specification, reference will be made to exemplary types of integrated circuits which are suitable for use in connection with the present invention, but it will be understood that where these examples are offered they are meant to be representative and not limiting with respect to the breadth of the invention.

BRIEF DESCRIPTION OF THE DRAWINGS

The present invention will be described with reference to the following specification and the accompanying drawings in which like numerals are used to refer to like parts or components where they may occur in several places in the drawings and wherein.

DETAILED DESCRIPTION OF THE PREFERRED EMBODIMENT

Figure 1:
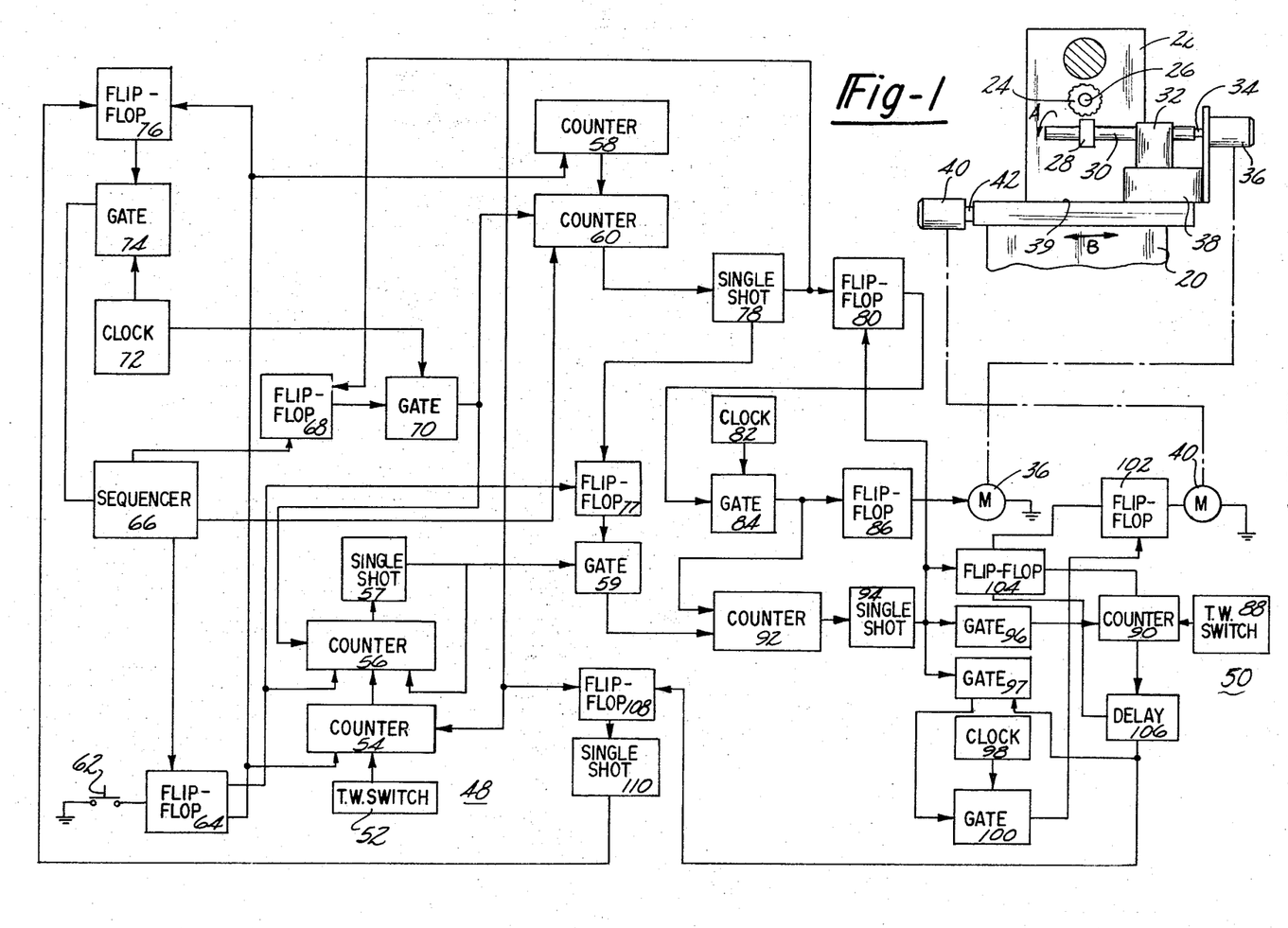
FIG. 1 is a combined block diagrammatic and schematic showing of mechanical elements and of the digital control system of the present invention as it is used to control the travel and indexing of a machine for cutting gear teeth.

FIG. 1 is referred to as showing the basic gear cutting machine which includes a machine base portion 20 and a machine stationary head portion 22. A rotary gear cutter 24, which may be a conventional milling cutter, is mounted on a driven shaft 26, which shaft in turn is driven through its own drive motor (not shown). The gear blank 28, which is to be machined, is mounted on a rotatable arbor or work spindle 30 which is rotatably journaled through a mounting post 32. The arbor is connected at its right hand end to the output or drive shaft 34 of a head stepping motor 36. It will be understood that the stepping motor 36 is used to rotate or index the gear blank 28 incrementally, for example in a counterclockwise direction as indicated by the arrow A. The amount of rotation of the gear blank 28 each time will determine the spacing between the separate gear teeth being formed and thus the number of teeth being cut in the periphery of the gear blank 28. It will further be seen that the mounting means for the gear blank 28 is carried on a table 38. The table 38 is movable leftwardly and rightwardly on a pair of machine ways 39 in the direction shown by arrows B through the operation of a table stepping motor 40.

In a typical gear or spline cutting operation, the individual tooth will be cut by a leftward motion with a rightward return motion of the table 38, followed by an indexing or rotary movement powered by the stepping motor 36, and then the cycle is repeated. It will be understood that the output shaft 42 of the table stepping motor 40 is connected through an intermediate lead screw or similar coupling arrangement to the table 38 to precisely control its degree of movement in a leftward or rightward direction. The detail of the table 38 driving and connecting mechanism is conventional and has been omitted from this application in the interest of brevity and simplification.

It will further be seen that the motor 36 is shown both in its physical outline and in a schematic designation to clarify the interconnection between the electronic control system and the motor. In a like manner, the table stepping motor 40 is shown in both its schematic designation and in its physical outline. The portion of the electronic control system which operates to control the head indexing movement and hence the number of teeth being cut is located at the lower left hand portion of the FIG. 1 drawing and is indicated generally by the numeral 48. The portion of the electronic control system related to the table indexing control which is somewhat less complex is located at the lower right hand portion of the drawing of FIG. 1 and is identified by the numeral 50.

Now, with reference to the system for controlling the number of teeth to be machined, included is a thumbwheel switch 52 which is used to provide a binary coded decimal input for a following binary coded decimal counter 54. This counter usually includes three decades with four switches for each decade. The second working counter is identified by the numeral 56. The counter 56 likewise includes three binary decade counters as will be shown in greater detail in FIG. 3 hereinafter.

Also included in the system for controlling head indexing are the upper counters 58 and 60. The counter 58 has been wired into the system and actually determines the number of even parts into which the circle, that is the circumference of the gear blank, will be divided. According to the number of decade stages and digits included in the counter 58, the accuracy is determined. The counter 58 is initiated in its operation by the cycle start switch 62 and associated flip-flop 64 and by the control output from these elements. The counter 60 is controlled in its operation by the control flip-flop 64 and and through an intermediate flip-flop 68 and a gate 70, which gate controls the input or clock pulses from a free-running clock pulse source 72 through a sequencer 66. The sequencer 66 in turn is controlled by the output of a gate 74. A further flip-flop 76 is includes in the system to ready the indexing section for operation at the end of each cutting pass of the machine table 38.

The output from the counter 60 is effective through intermediate single-shot 78 and flip-flop 80 and the following stages to control the operation of the head stepping motor 36. Included in the pulse input channel for the head stepping motor 36 is a separate free-running clock 82, a gate 84 and a final input stage comprising a dual flip-flop 86.

As previously stated, the control system for the table stepping motor 40 is included at the lower right hand portion of the circuit and indicated generally by the numeral 50. There is provided a thumbwheel switch 88 to selectively set the length of table travel required in increments of decimal parts of an inch as for an input for a separate decade counter 90. The decade counter 90 is connected to a pulse output from an up-and-down counter 92 through a single-shot 94 and a gate 96. A source of pulses for driving or stepping the table stepping motor 40 is provided from a further free-running clock pulse source 98, a gate 100 and a final dual flip-flop 102. The single shot 94 performs the function of operating the flip-flop 80 and resetting the gate 84 so that the gate will pass no further pulses to the head stepping motor 36. The gate 97 once reset will permit the free-running clock 98 to send the pulses to drive the table stepping motor 40.

Also included in the circuit is a flip-flop 104 which when reset will permit the table stepping motor 40 to count in the opposite direction. For example, if the count in the counter 90 has first been counted down rightwardly, it will then be counted down leftwardly except that on the return a rapid return movement is employed. A delay stage 106 is connected to the circuit to provide an output to set a following flip-flop 108, which in turn energizes a single-shot multivibrator 110, which in turn sets again the flip-flop 76. This enables the sequencer 66 to pass pulses from the free-running clock 72 and start the process over again with the next following indexing movement of the head stepping motor control system 48. The system for operating the motors 36 and 40, as shown in FIG. 1, will be fully described in the "Description of Operation" hereinafter after due consideration has been given to the various circuit IC components and their mode of interconnection.

Figure 2:
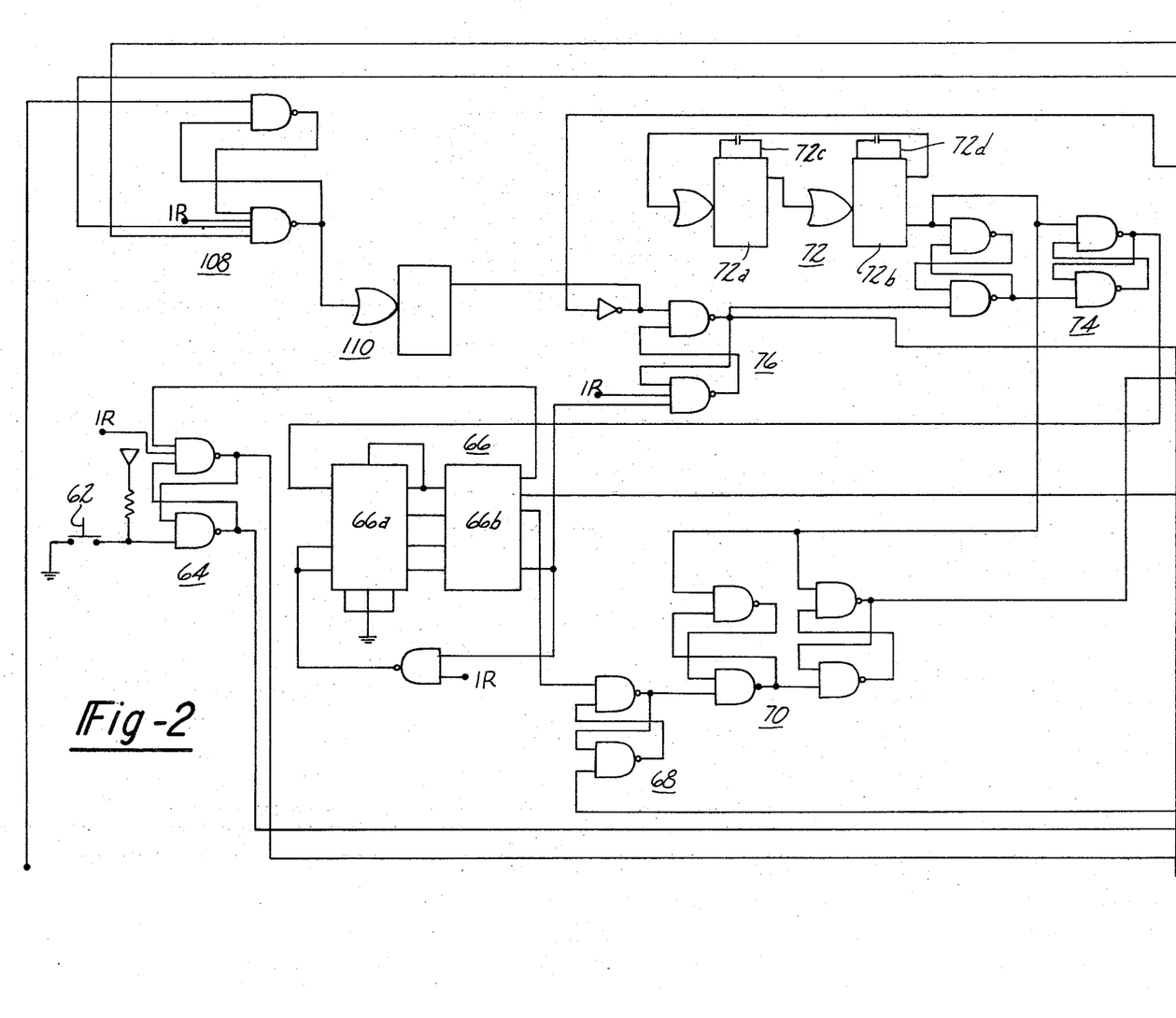
FIGS. 2 through 5 are combined schematic and block diagrammatic drawings illustrating the several parts of the numerical control system, as well as the output stage used to control the operation of the stepping motors which provide the indexing and then the reciprocating feed movement of the machine.
Figure 3:
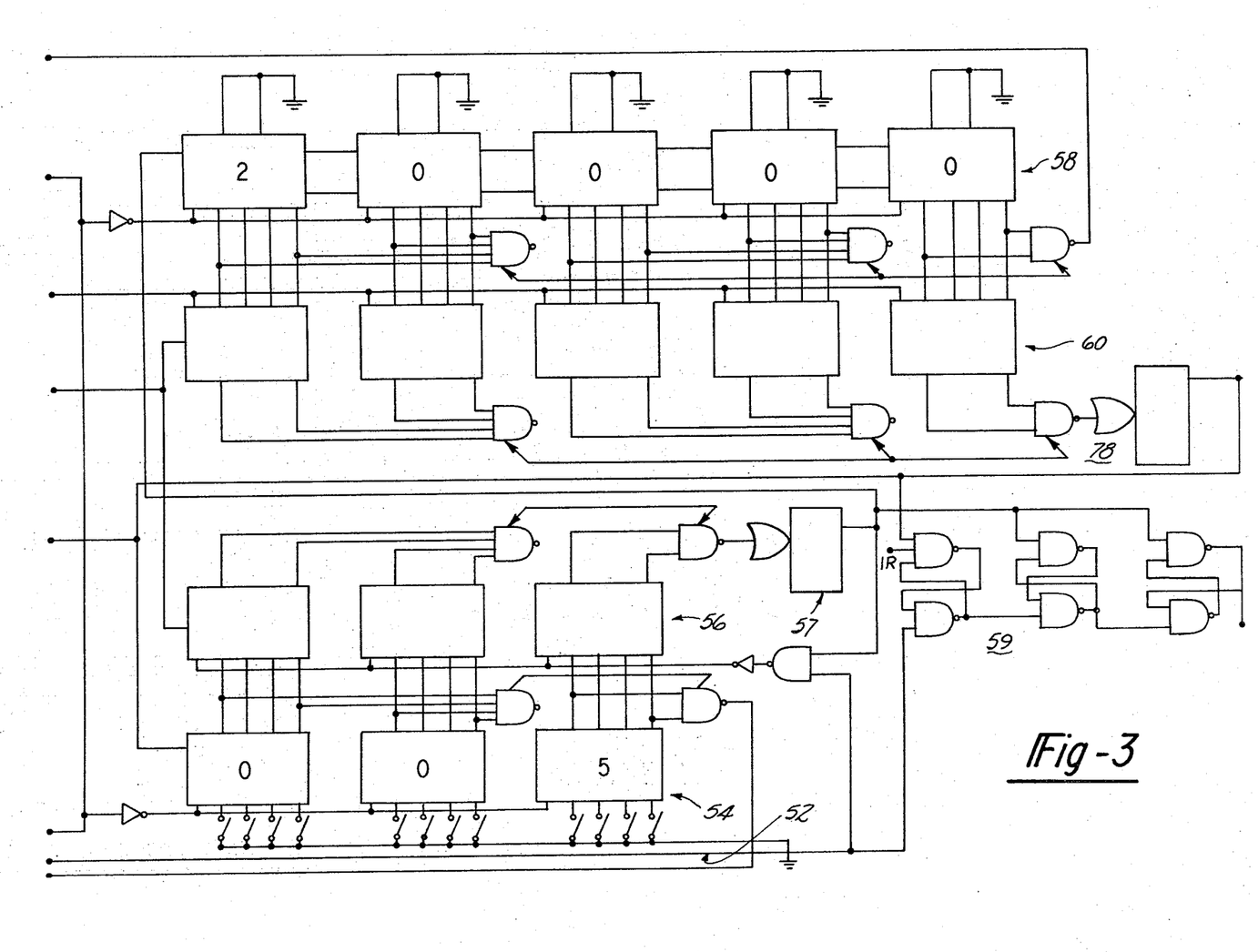
Figure 4:
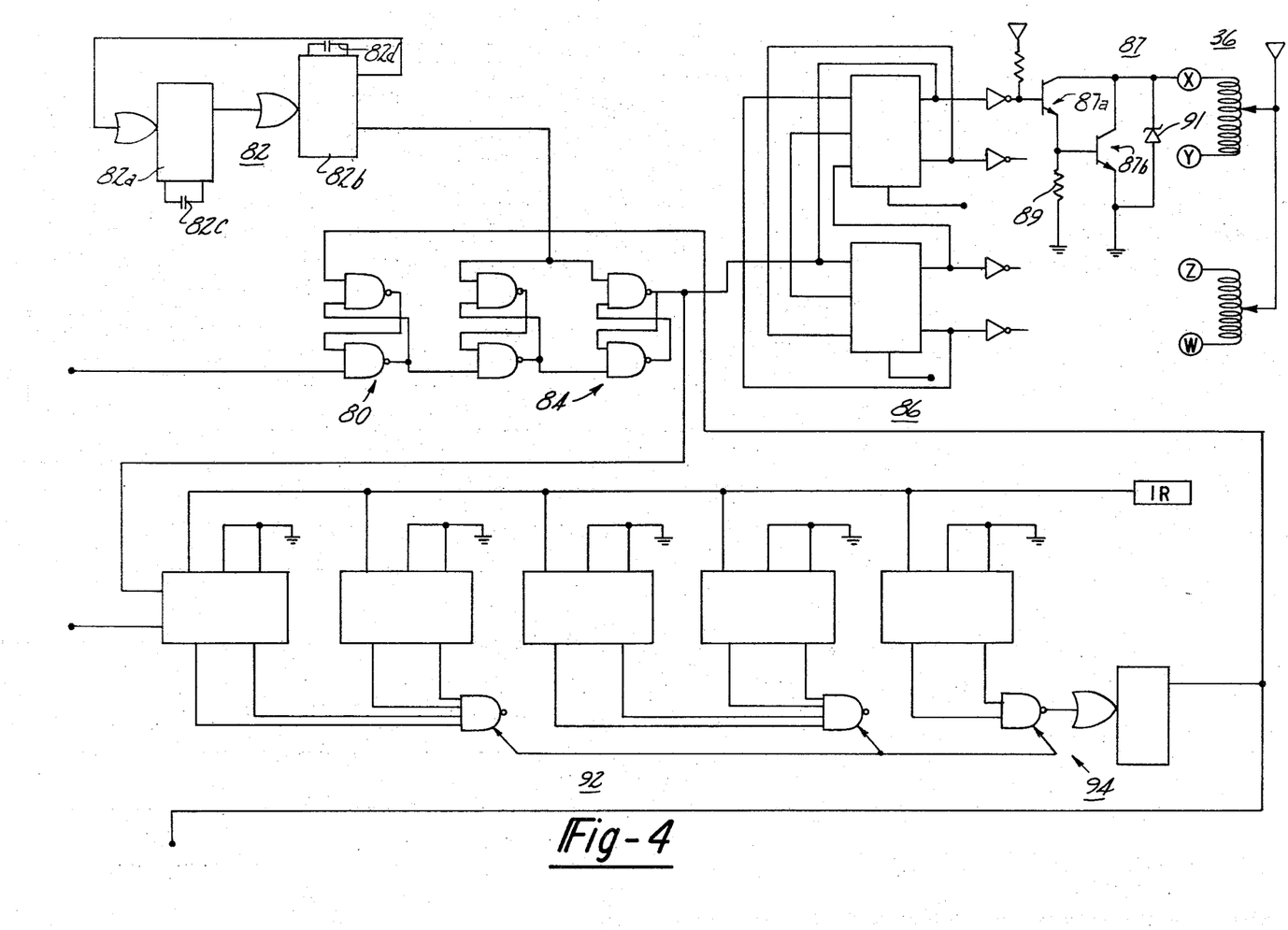

FIGS. 2, 3, and the upper portion of FIG. 4, show the detailed schematic of the electronic digital control system for operating the head stepping motor 36. Inverters, identified by the conventional symbol, are connected in the circuit as required. Included in this system are the thumbwheel switches 54 which select by their setting the number of teeth to be cut in the periphery of the gear blank 28. Once they have been set, these switches further afford a visual display of the conditions under which the gear cutting machine is being operated. A separate counter 56 is controlled in accordance with the settings made on the counter 54. The counters 58 and 60 are shown at the upper part of the FIG. 3 drawing and represent a five digit cascaded decade counter with the decimal setting representing the number of parts into which the gear blank is to be cut. As an exemplary setting, 20,000 has been prewired into the counter 58. This number is transferred into the counter 60 which is a working counter during a cycle of operation. It is preferable that integrated circuits or ICs be used for economy, compactness of design and reliability of operation. One example of a decade counter suitable for use in the present invention for counters 54 and 56 is the up-down decade counter Model DM8560 currently manufactured and sold by the National Semiconductor Coporation of Santa Clara, Calif. Similar type decade counters may be used in the counter 92 shown in FIG. 4, which is subsequently employed to count up and down and then initiate the stepping of the table 38 through the operation of the table stepping motor 40.

FIG. 2 shows the cycle start switch 62 and the next following control flip-flop 64. The control flip-flop 64 may comprise for example, an upper triple input gate and a lower input gate. these may be embodied by way of example with integrated circuits Models MC862-P and MC846-P now manufactured and sold by the Motorola Corporation of Phoenix, Ariz. It will bbe understood that these particular IC's can be used as building blocks for a great number of the system components to be described hereinafter.

The function of the flip-flop 64 is to provide a transfer of the information preset in the thumbwheel switches 54 to the decade counter 56 preparatory to the cycle of operation. Information for the uppermost decade counter 58 of FIG. 3 has already been prewired for 20,000 as indicated numerically on the box representation for the counter 58. At the same time, the flip-flop 64 will be presetting the flip-flop 76, which in turn enables the gate 74. The gate 74 operates as a gate for the output of the free-running clock 72. It will be understood that the clock 72 may be comprised of a pair of monostable flip-flops 72a, 72b such as, for example, flip-flop Model MC851-P currently commercially available from the Motorola Corporation of Phoenix, Ariz.

The pulse output from the clock 72 when passed through the gate 74 serves to operate the sequencer 66. Included in the sequencer 66 are two stages — a binary coded decimal counter 66a and a converter 66b for converting the binary coded decimal to a straight decimal output. Integrated circuits suitable for use in the sequencer 66 are, for example, Models Sn7490 and Sn7442 currently manufactured and sold by Signetics Corporation of Sunnyvale, Calif. It will be seen that the first pulse output from the sequencer 66 is fed back to the control flip-flop 64 to set it, so that if the operator desires to set the cycle again the flip-flop 64 will be in the proper condition. The next pulse output from the sequencer 66 is passed through a subsequent flip-flop 68 and a gate 70 to provide the function of transferring the information prewired into the upper decade counter 58 into the lower decade counter 60. There is provided a third output pulse from the sequencer 66, which operates to set the next flip-flop 68 so that the pulses originating from the clock pulse source 72 are allowed to pass through tthe gate 74. The pulses from the clock 72 are thus permitted to pass to both the counter 60 and the counter 56. It will be understood that when the first flip-flop 64 was reset, the information preset in the counter 54 was being transferred to the counter 56 in a like manner as to the transfer of information between counters 58 and 60 already referred to.

Also connected in the circuit is a single shot 57 which performs the operation of resetting the counter 54 to its orginal condition and also resetting the counter 58 to its original condition. Each time a number is being subtracted from the preset entry, that pulse is also being fed to a through gate 59 following counter 92, the detail of which is best shown in the lower portion of the FIG. 4 drawing. An additional single shot multivibrator 78 is used to activate the gate 84 through the operation of the flip-flop 80. The gate 84 controls the output from a second free-running clock 82. The actual drive circuit or the head stepping motor 36 is provided by a dual flip-flop stage 86. The dual flip-flop 86 may be embodied as a dual JK flip-flop Model MC853-P currently manufactured and sold by the Motorola Corporation of Phoenix, Ariz.

An amplifier stage for the motor 36 drive is transistor stage 87. Included in the stage 87 are a pair of transistors 87a and 87b. An emitter resistor 89 is included in the circuit and a zener diode 91 is included for regulation. The control coils for the head stepping or indexing motor 36 are shown and the respective terminals are numbered $x, y, z$, and $w$. The stepping motor 26 is operated through a predetermined sequence of its coils, which is, for example $x,y$; $y,z$; $z,w$; $w,x$; and cycle is repeated so that two coils are energized and two coils at the same time are deenergized to provide stepping of the motor 36 in one direction.

If the stepping motor, such as motor 40, is to be operated in the opposite direction, the sequence is simply reversed.

Figure 5:
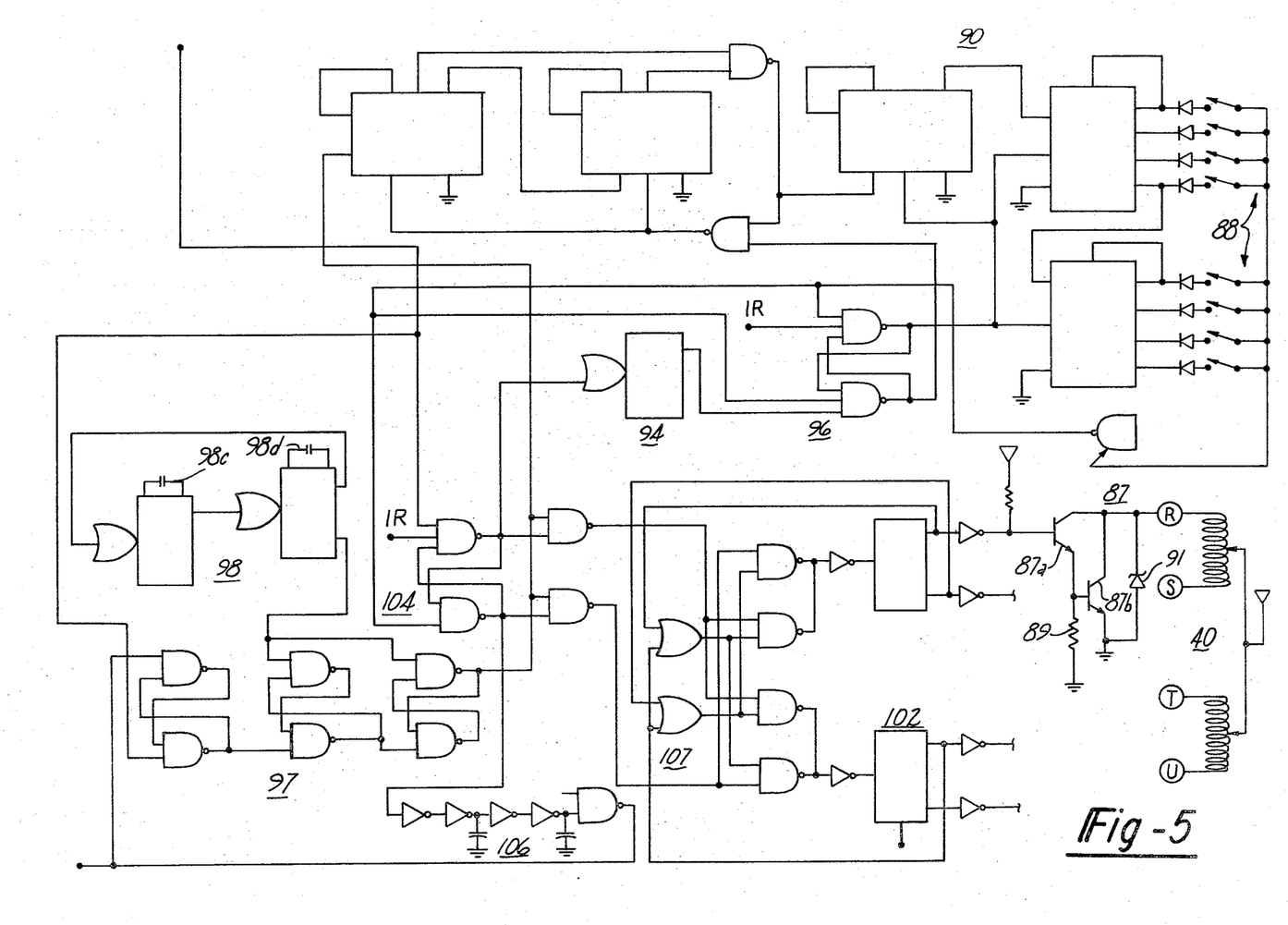

A similar drive arrangement with a drive stage 87 and a pair of transistors 87a and 87b is shown for the table stepping motor 40 at the lower right hand portion of the FIG. 5 drawing. It will be understood that the single shot multivibrator 94 coupled to the output of the counter 92 has a dual function: that of resetting the gate 84 at the end of the indexing part of the cycle to inhibit further pulses to the head stepping motor 36, and at the same time activating the gate 97 so that the pulses from the free-running clock source 98 are then permitted to drive the stepping motor 40 so that table feed is initiated. Thus, the operation performed is changed over between head indexing of the gear blank 28 through the head stepping motor 36 and table feeding of the table 38 through the table stepping motor 40. Once the gate 97 has been activated, the pulses are passed from the free-running clock pulse source 98 and through to the stage 102 to provide the table stepping operation through the stepping motor coils in the manner just indicated for the head stepping motor 36. The presetting of the travel distance of the head 38 is provided by the setting of the switches 88, which preferably are thumbwheel switches, allowing a visual indication of the distance being preset for table travel. The counter stage 90 provides for a division of the total distance into decimal inches. One type of counter appropriate for use in the counter stage 90 is the decade counter Model SN7490 commerically manufactured and sold by Signetics Corporation of Sunnyvale, Calif. It is important that the table 38 travel be provided first in one direction for the cutting stroke and then in the opposite direction for the return stroke. As the countdown occurs in the counter 90, it is also resetting the flip-flop 104. The flip-flop 104 when reset allows the table stepping motor 40 to count in an opposite direction so that if the initial travel was to the right it will now be the same distance to the left, except that this time the travel will occur at a much faster rate, that is, with a rapid return. This time when the correct count is repeated there will be provided an output pulse from a delay line 106, which will be communicated through the flip-flop 108 and single shot 110 to reset the flip-flop 76 and start the operation of the sequencer 66 to repeat the head index cycle of operation again.

As shown in FIG. 5, the table stepping motor 40 has its coil terminals lettered R, S, T and U and it will be understood that for a forward operating sequence the coils will be energized R–S, S–T, T–U and U–R and the cycle will be repeated. In opposite direction travel, this sequence will be reversed. It will be seen that there are included in the circuit a pair of OR gates 107 as inputs to the dual flip-flop 102. The OR gates 107 may be embodied as two input OR gates, such as Model MC1812-P currently manufactured and sold by Motorola Corporation of Phoenix, Ariz. This portion of the circuit controls the coil sequencing of the motor 40 in its forward and reverse operation.

DESCRIPTION OF OPERATION

The operation of the control system according to my invention will now be described, giving particular attention to the block diagram of FIG. 1 and the schematic of FIG. 3. The thumbwheel switch 52 has preset on it the number of teeth which are to be cut in the gear 28. The degree of accuracy is prewired into the counter 58 with the setting being made representative of the number of even parts into which the circle representing the circumference of the gear blank will be divided. The operator also will have preset the thumbwheel switch 88 to predetermine the amount of travel of the table 38 which carrier the gear blank 28 through a cutting stroke by the rotary cutter 24. It will be obvious to one skilled in the machine tool art that with an appropriate change of the machine tool elements, the cutting stroke may be accomplished by maintaining the gear blank 28 and the spindle 30 stationary and moving the milling cutter 24 in a suitable cutting path of travel. The distance of travel may, by way of example, be presettable between 2 and 5 inches with each inch being divided into thousandths of an inch.

It will be noted that in FIGS. 2–5 there are a number of reset terminals identified IR, which are provided with a reset pulse so that all of the flip-flops, such as flip-flops 104, 64, 76 and the other flip-flops in the system will be initially reset in the condition required. An appropriate single reset pulse is thus provided for the reset of the flip-flops at the beginning of the operation.

In the operation of the system, once the number of teeth have been dialed in and the table travel distance has been dialed, the operator then operates the cycle start switch 62 which sets the flip-flop 64. The lowermost output from the flip-flop 64 then serves to transfer from counter 54 to counter 56 the information that has been previously set by the operator in counter 54 through the thumbwheel switch 52. At the same time, the prewired setting in the upper counter 58 is transferred into the working counter 60. In the numerical example we have chosen, the circuit was divided into 20,000 even parts. At the same time, there is provided an output to the flip-flop 76 to set it and enable the gate 74 thus to provide passage of the clock pulses from the free-running clock 72. The sequencer 66 is provided with a binary coded input as previously described. The first pulse output from the sequencer 66 is used to reset the flip-flop 64 to permit restart by the operator if he so desires.

The second pulse from the sequencer 66 is used to transfer information already transferred by the flip-flop 64 to the counter 58 to the counter 60. The next pulse is used to reset the flip-flop 68, which turns on or enables the gate 70 so that the clock pulses pass into the counters 60 and 56. After the number of pulses are received as preset in the counter 56, the single shot 57 enables the gate 59, at the same time resetting the counter 56. The information is also being passed on to the counter 92. After the count in the counter 56 has been transferred to the counter 92, the count in the counter 60 will operate a single shot multivibrator 78 which will enable the gate 84 through flip-flop 80. Thus, the free-running clock pulses from clock 82 will be passed through the dual flip-flop 86 and the associated drive stage 87, as shown in FIG. 4, to step the head stepping motor 36 the required number of steps.

When the number preset and transferred to the counter 92 has returned to zero, the single shot multivibrator 94 will be activated to provide a pulse output to flip-flop 104, gate 96 and gate 97. The gate 84 will thus be reset to inhibit the passage of any more pulses from the clock 82 to step the motor 36. At the same time, the table travel is initiated by activating of the gate 97 and gate 100 to provide clock pulses from the clock 98 to pass and drive the flip-flop 102 and the associated drive circuit 87 as shown in FIG. 5. After the correct number of pulses has passed to move the table 38 in accordance with the presetting on the thumbwheel switch 88, the counter 90 will reset. The flip-flop 104 will then be switched which will then provide counting and the stepping of the stepping motor 40 in an opposite direction. When the right count is again sensed, the output pulse will be passed from the counter 90 to the delay 106. The delay pulse output from the delay stage 106 is then passed to reset the flip-flop 108 and activate the single shot 110, thus resetting the flip-flop 76 to permit another indexing cycle of operation through the sequencer 66 as previously described.

The entire process set forth above will be repeated for as many times as the thumbwheel switches 52 have been set. In our exemplary embodiment, the cycle will be repeated five times. Each time the decade counter 60 will count down until all 20,000 pulses have been counted. When the counter 58 is finally counted down to zero, the flip-flop 76 will be reset for the last time. In accordance with our example, if the counter 58 is preset at 20,000 and the thumbwheel switches 52 and therefore the counter 54 are set at five, then the division will be performed in such manner that 20,000 will be divided by five. This will leave a 4,000 pulse count which will actually be transferred into the counter 92 and this will be the number of pulses which the system will step the head stepping motor 36 in one direction. These 4,000 steps are also being subtracted from the total of 20,000 in the counter 58. At the same time, the number one is subtracted from the five preset in the counter 54 to reduce it to four. At the end of the first indexing operation, the counter 58 has been reduced to 16,000 and the counter 54 has been set back to four. At the end of the next cycle of operation, the count left in the counter 58 is 12,000 and the count left in counter 54 is three. Each time, the table 38 is moving leftwardly-rightwardly to return. The next index is set so that the 12,000 has been divided by three and we have another 4,000 pulses which are passed to the counter 92 and thence passed to step the motor 36. In the final operation, there is a count of 4,000 left in the counter 58 which is divided by one left in the counter 54. This gives a 4,000 count which is then subtracted from the counter 58, leaving it with a zero count. At this point, a pulse output from the counter 58 blocks the flip-flop 108 so that no more counting can occur until another complete cycle is started by cycle start switch 62.

It will thus be seen that the present invention offers the capability of ready changeover as the accuracy of the operation needs to be increased or decreased. By simply dropping off the final decade stages, of, for example, counters 58 and 60, the accuracy can be reduced to a lower level required. In the event a more accurate machining operation is required, additional decade stages can be switched in for the counters 58 and 60. It will be understood that external capacitors may be added as necessary, for example, such as capacitors 98c and 98d in the clock stage 98 (FIG. 5) or 82c and 82d in the clock stage 82 (FIG. 4), to adjust the frequency of operation. The purpose of the delay line 106 is to make sure that there is a completion of the table indexing travel before the next indexing cycle is initiated.

It will thus be seen that I have provided by the present invention an extremely versatile and accurate electronic control system for cutting gear teeth or the like in a workpiece. The invention is applicable to any type of machining apparatus in which a precise, digitally controlled movemen of the headpiece and a similar precisely controlled movement of the table are needed. Changeover of operation with respect to the number of gear teeth and the cutting stroke can be readily made by the setting of the two thumbwheel switches, thus giving a visual indication of the exact settings in which machining is being carried out.

What is claimed is:

1. An electronic control system of the digital type for providing a precision rotary indexing movement of a part to be machined comprising:
   a rotatable mounting means for said part;
   a stepping motor having its output operatively connected to said mounting means for providing an incremental rotary movement of said part;
   a first counter preset in accordance with the number of incremental steps into which a full circle rotary movement of said part is to be divided;
   a second counter;
   a manually operated means for presetting said second counter in accordance with the number of separate indexing positions into which the part is to be turned;

means for dividing the first number preset in said first counter by the number preset in the second counter;

means for deriving a pulse train representative of the digital value of the quotient;

drive means for converting the pulse train into a plurality of stepping pulses for said stepping motor; and means for providing a feed and return stroke of said part in an axial direction at the end of each operation of said drive means.

2. The combination as set forth in claim 1 wherein said last mentioned means comprises a second stepping motor and a digital control means presettable with a number representative of the distance of travel required for said table.

3. The combination as set forth in claim 2 wherein an intermediate up-down counter is included in said system for initiating the operation of said second stepping motor subsequent to each completion of operation of said drive means.

4. The combination as set forth in claim 3 wherein said second counter comprises a multiple decade counter and said manually operated means comprises a thumbwheel switch operable to provide a predetermined binary coded decimal input to said seccond counter.

5. The combination as set forth in claim 1 wherein said part is mounted on a spindle coupled to the output of said stepping motor and said means for providing a feed and return stroke of said part comprises a table movable on ways parallel to the axis of said part.

6. The combination as set forth in claim 3 wherein said first and second stepping motors are operated by different clock sources, each having a selectively variable frequency of operation.

7. A digital control system for cutting teeth in a gear blank including a stepping motor for indexing the blank in a rotary manner to a plurality of tooth cutting positions and a second motor for providing a timed cutting stroke and relative movement between the blank and an aligned cutter means, comprising a first counter preset in accordance with the number of parts into which the gear blank periphery is to be divided;

a second counter selectively preset with the number of teeth to be cut into the gear blank;

means for dividing the first number by the second number and providing a pulse output equal to the quotient resulting from the dividing operation; and gating means for passing said number of pulses to said stepping motor for controlling its incremental movement between successive tooth cutting positions.

8. The combination as set forth in claim 7 wherein said second counter has associated with it a plurality of manipulatable switches for selectively presetting it in the number representing the number of teeth to be cut.

9. The combination as set forth in claim 8 wherein said first counter includes a plurality of cascaded decade stages of the number of parts into which the gear blank circumference is to be divided.

10. The combination as set forth in claim 7 wherein said gear blank is mounted on a table reciprocably movable by said second motor in a machining pass and wherein said cutter comprises a milling cutter mounted in a stationary position relative to said gear blank.

11. The combination as set forth in claim 7 wherein said gear blank is mounted in a stationary position relative to movement in an axial direction and wherein said cutter comprises a milling cutter movable axially relatively to said gear blank during a gear cutting pass.

12. The combination as set forth in claim 10 wherein said second motor comprises a stepping motor for providing a precisely controllable movement of said table relative to said gear blank and wherein a further counter means and a plurality of manually operable switches associated with said counter are used to control the incremental degree of movement of said table in its feed and return direction.

13. The combination as set forth in claim 12 wherein said movement in a forward cutting direction is at a substantially slower rate than the return feed movement of said table.

14. The combination as set forth in claim 12 wherein a gating means is connected intermediate said counters controlling the incremental indexing of said blank and said second motor controlling the reciprocating movement whereby the forward and rearward stroke of said blank relative to said cutter is initiated at the end of each tooth indexing movement.

15. The combination as set forth in claim 14 wherein a pair of clock pulse sources are included, one for said first group of counters and one for said second counter controlling the feed stroke whereby the feed and return of said cutter may be varied selectively and independently of the speed of operation of said stepping motor controlling the gear blank indexing.

16. The combination as set forth in claim 15 wherein said clock pulse sources comprise multivibrators of the integrated circuit type, each having its frequency of operation variable by the connection of an external capacitor.

17. A digital control system for cutting teeth in a gear blank including a first stepping motor for indexing the blank in a rotary manner to a plurality of tooth cutting positions and a second stepping motor for providing a timed cutting stroke movement of the blank relative to a stationary cutter, said system comprising:

a first counter preset in accordance with the number of parts into which the gear blank circumference is to be divided;

a second counter selectively preset with the number of teeth to be cut into the gear blank;

means for dividing the second number by the first number and providing a digital representation of the quotient;

a third counter for storing said digital representation of the quotient;

driving means for said first stepping motor for providing a digital stepping movement of said first motor responsive to the count stored in said third counter; and gating means for enabling the operation of said second stepping motor responsive to the count to zero of said third counter.

18. The combination as set forth in claim 17 wherein a fourth counter is included in the system for controlling the feed of said second stepping motor, said system including a manipulatable switching means for presetting it to determine the extent of movement of said second stepping motor in a forward stroke, and a flip-flop connected to said fourth output for initiating a like distance return stroke following the completion of said forward stroke.

19. The combination as set forth in claim 18 wherein a gating means is operably connected intermediate said first counter and said fourth counter for providing a forward and return movement by said second stepping motor after each cycle of operation of said first stepping motor.

20. The combination as set forth in claim 17 wherein each of said counters is coupled to a clock of the integrated circuit type having terminals for coupling an external capacitor for adjusting its frequency of operation.

21. The combination as set forth in claim 17 wherein said means for presetting said second counter comprises a binary coded decimal type thumbwheel switch for providing a visual indication of the parameters of the gear cutting operaion.

22. The combination as set forth in claim 17 wherein a separate free-running clock pulse source is operably connected to each of said counters for providing separate time controlled operation of each of the respective counters.

23. The combination as set forth in claim 22 wherein said gear blank is machined by a stationary cutter rotatably mounted in cutting relationship proximate its path of travel and wherein said gear blank is fixed to an arbor, said arbor mounted on a table axially movable under the control of said second stepping motor.

24. The combination as set forth in claim 23 wherein said second stepping motor is movable at a predetermined speed during the feed operation and movable at a somewhat more rapid rate of movement in its return stroke.

25. The combination as set forth in claim 17 wherein said driving means comprises a dual JK flip-flop having its output coupled to said first motor for energizing its coils in a predetermined sequence to provide said movement.

26. The combination as set forth in claim 18 wherein a driving means is included for said second motor, said driving means comprising a dual JK flip-flop having its output coupled to the coils of said motor for energizing its coils in a predetermined sequence to provide said forward stroke and for energizing its coils in a reverse sequence to provide said return stroke.

* * * * *

UNITED STATES PATENT OFFICE
CERTIFICATE OF CORRECTION

Patent No. 3,793,575　　　　　　　　Dated　February 19, 1974

Inventor(s) Ryszard Sieradzki and Daniel Goldman

It is certified that error appears in the above-identified patent and that said Letters Patent are hereby corrected as shown below:

Col. 3, line 13, after "input", delete "or" and insert --of--;

line 17, delete "includes" and insert --included--.

Col. 4, line 21, delete "Coporation" and insert --Corporation--;

line 33, delete "bee" and insert --be--;

line 34, delete "IC's" and insert --ICs--;

lines 64-66, delete "is passed through a subsequent flip-flop 68 and a gate 70 to provide the function of transferring" and insert --transfers--.

Col. 5, line 5, "tthe" should read -- the --;

line 5, delete "74" and insert --70--;

line 11, delete "informaion" and insert --information-- line 14, delete "54" and insert --56--;

line 24, delete "or" and insert --for--.

Col. 6, line 47, delete "carrier" and insert --carries--.

Col. 7, line 62, delete "When" and insert --After the flip-flop 76 will be reset for the last time--;

UNITED STATES PATENT OFFICE
CERTIFICATE OF CORRECTION

Patent No. 3,793,575  Dated February 19, 1974

Inventor(s) Ryszard Sieradzki and Daniel Goldman

It is certified that error appears in the above-identified patent and that said Letters Patent are hereby corrected as shown below:

-- Page 2 --

Col. 7, line 63, delete "the flip-flop 76 will be reset for the last time".

Col. 8, line 46, delete "movemen" and insert --movement--.

Col. 9, line 26, delete "seccond" and insert --second--.

Col. 10, line 67, after "fourth", insert --counter--.

Signed and sealed this 17th day of September 1974.

(SEAL)
Attest:

McCOY M. GIBSON JR.
Attesting Officer

C. MARSHALL DANN
Commissioner of Patents